United States Patent
Mosko et al.

(10) Patent No.: US 9,363,179 B2
(45) Date of Patent: Jun. 7, 2016

(54) MULTI-PUBLISHER ROUTING PROTOCOL FOR NAMED DATA NETWORKS

(71) Applicant: Palo Alto Research Center Incorporated, Palo Alto, CA (US)

(72) Inventors: Marc E. Mosko, Santa Cruz, CA (US); Jose J. Garcia-Luna-Aceves, San Mateo, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 168 days.

(21) Appl. No.: 14/226,559

(22) Filed: Mar. 26, 2014

(65) Prior Publication Data

US 2015/0281071 A1     Oct. 1, 2015

(51) Int. Cl.
   G06F 15/173   (2006.01)
   H04L 12/741   (2013.01)
   H04L 12/24    (2006.01)

(52) U.S. Cl.
   CPC .............. H04L 45/745 (2013.01); H04L 41/12 (2013.01)

(58) Field of Classification Search
   CPC .............................. H04L 45/745; H04L 41/12
   See application file for complete search history.

(56) References Cited

U.S. PATENT DOCUMENTS

| | | |
|---|---|---|
| 817,441 A | 4/1906 | Niesz |
| 4,309,569 A | 1/1982 | Merkle |
| 4,921,898 A | 5/1990 | Lenney |
| 5,070,134 A | 12/1991 | Oyamada |
| 5,110,856 A | 5/1992 | Oyamada |
| 5,506,844 A | 4/1996 | Rao |
| 5,629,370 A | 5/1997 | Freidzon |
| 5,870,605 A | 2/1999 | Bracho |
| 6,052,683 A | 4/2000 | Irwin |

(Continued)

FOREIGN PATENT DOCUMENTS

| | | |
|---|---|---|
| DE | 1720277 A1 | 6/1967 |
| DE | 19620817 A1 | 11/1997 |

(Continued)

OTHER PUBLICATIONS

J. Lotspiech, S. Nusser, and F. Pestoni. Anonymous Trust: Digital Rights Management using Broadcast Encryption. Proceedings of the IEEE 92.6 (2004).

(Continued)

*Primary Examiner* — Michael Y Won
(74) *Attorney, Agent, or Firm* — Shun Yao; Park, Vaughan, Fleming & Dowler LLP

(57) ABSTRACT

A multi-publisher routing system facilitates forwarding an Interest to multiple publishers associated with a namespace. During operation, network devices across a computer network can perform distance-vector routing with one or more network neighbors to determine a network topology. Also, one or more network devices may receive a namespace-join message from one or more publishers that are to provide content objects for the namespace. These network devices that receive the namespace-join message can construct an acyclic graph that includes one or more publishers for the namespace, and includes one or more forwarder nodes that form network paths between the one or more publishers. Then, when a network node in the acyclic graph receives an Interest message that specifies a name prefix associated with the namespace, this network node can forward the Interest message along the acyclic graph to one or more publishers associated with the namespace.

18 Claims, 8 Drawing Sheets

(56) References Cited

U.S. PATENT DOCUMENTS

| | | | | |
|---|---|---|---|---|
| 6,091,724 | A | 7/2000 | Chandra | |
| 6,173,364 | B1 | 1/2001 | Zenchelsky | |
| 6,226,618 | B1 | 5/2001 | Downs | |
| 6,233,646 | B1 | 5/2001 | Hahm | |
| 6,332,158 | B1 | 12/2001 | Risley | |
| 6,366,988 | B1 | 4/2002 | Skiba | |
| 6,574,377 | B1 | 6/2003 | Cahill | |
| 6,654,792 | B1 | 11/2003 | Verma | |
| 6,667,957 | B1 | 12/2003 | Corson | |
| 6,681,220 | B1 | 1/2004 | Kaplan | |
| 6,681,326 | B2 | 1/2004 | Son | |
| 6,769,066 | B1 | 7/2004 | Botros | |
| 6,772,333 | B1 | 8/2004 | Brendel | |
| 6,862,280 | B1 | 3/2005 | Bertagna | |
| 6,901,452 | B1 | 5/2005 | Bertagna | |
| 6,917,985 | B2 | 7/2005 | Madruga | |
| 6,968,393 | B1 | 11/2005 | Chen | |
| 6,981,029 | B1 | 12/2005 | Menditto | |
| 7,013,389 | B1 | 3/2006 | Srivastava | |
| 7,031,308 | B2 | 4/2006 | Garcia-Luna-Aceves | |
| 7,061,877 | B1 | 6/2006 | Gummalla | |
| 7,152,094 | B1 * | 12/2006 | Jannu et al. | 709/206 |
| 7,177,646 | B2 * | 2/2007 | O'Neill et al. | 455/450 |
| 7,206,860 | B2 | 4/2007 | Murakami | |
| 7,257,837 | B2 | 8/2007 | Xu | |
| 7,287,275 | B2 | 10/2007 | Moskowitz | |
| 7,315,541 | B1 | 1/2008 | Housel | |
| 7,339,929 | B2 | 3/2008 | Zelig | |
| 7,350,229 | B1 | 3/2008 | Lander | |
| 7,362,727 | B1 * | 4/2008 | O'Neill et al. | 370/331 |
| 7,382,787 | B1 | 6/2008 | Barnes | |
| 7,444,251 | B2 | 10/2008 | Nikovski | |
| 7,466,703 | B1 | 12/2008 | Arunachalam | |
| 7,472,422 | B1 | 12/2008 | Agbabian | |
| 7,496,668 | B2 | 2/2009 | Hawkinson | |
| 7,509,425 | B1 | 3/2009 | Rosenberg | |
| 7,523,016 | B1 | 4/2009 | Surdulescu | |
| 7,543,064 | B2 | 6/2009 | Juncker | |
| 7,552,233 | B2 | 6/2009 | Raju | |
| 7,555,482 | B2 | 6/2009 | Korkus | |
| 7,555,563 | B2 | 6/2009 | Ott | |
| 7,567,547 | B2 | 7/2009 | Mosko | |
| 7,567,946 | B2 | 7/2009 | Andreoli | |
| 7,580,971 | B1 | 8/2009 | Gollapudi | |
| 7,623,535 | B2 | 11/2009 | Guichard | |
| 7,647,507 | B1 | 1/2010 | Feng | |
| 7,660,324 | B2 | 2/2010 | Oguchi | |
| 7,685,290 | B2 | 3/2010 | Satapati | |
| 7,698,463 | B2 | 4/2010 | Ogier | |
| 7,769,887 | B1 | 8/2010 | Bhattacharyya | |
| 7,779,467 | B2 | 8/2010 | Choi | |
| 7,801,177 | B2 | 9/2010 | Luss | |
| 7,816,441 | B2 | 10/2010 | Elizalde | |
| 7,831,733 | B2 | 11/2010 | Sultan | |
| 7,908,337 | B2 | 3/2011 | Garcia-Luna-Aceves | |
| 7,924,837 | B1 | 4/2011 | Shabtay | |
| 7,953,885 | B1 | 5/2011 | Devireddy | |
| 8,000,267 | B2 | 8/2011 | Solis | |
| 8,010,691 | B2 | 8/2011 | Kollmansberger | |
| 8,074,289 | B1 | 12/2011 | Carpentier | |
| 8,117,441 | B2 | 2/2012 | Kurien | |
| 8,160,069 | B2 | 4/2012 | Jacobson | |
| 8,204,060 | B2 | 6/2012 | Jacobson | |
| 8,214,364 | B2 | 7/2012 | Bigus | |
| 8,224,985 | B2 | 7/2012 | Takeda | |
| 8,225,057 | B1 | 7/2012 | Zheng | |
| 8,271,578 | B2 | 9/2012 | Sheffi | |
| 8,312,064 | B1 | 11/2012 | Gauvin | |
| 8,386,622 | B2 | 2/2013 | Jacobson | |
| 8,467,297 | B2 | 6/2013 | Liu | |
| 8,473,633 | B2 * | 6/2013 | Eardley | 709/239 |
| 8,553,562 | B2 | 10/2013 | Allan | |
| 8,572,214 | B2 | 10/2013 | Garcia-Luna-Aceves | |
| 8,654,649 | B2 | 2/2014 | Vasseur | |
| 8,665,757 | B2 | 3/2014 | Kling | |
| 8,667,172 | B2 | 3/2014 | Ravindran | |
| 8,688,619 | B1 | 4/2014 | Ezick | |
| 8,699,350 | B1 | 4/2014 | Kumar | |
| 8,718,055 | B2 * | 5/2014 | Vasseur et al. | 370/389 |
| 8,750,820 | B2 | 6/2014 | Allan | |
| 8,761,022 | B2 | 6/2014 | Chiabaut | |
| 8,762,477 | B2 | 6/2014 | Xie | |
| 8,762,570 | B2 | 6/2014 | Qian | |
| 8,762,707 | B2 | 6/2014 | Killian | |
| 8,767,627 | B2 | 7/2014 | Ezure | |
| 8,817,594 | B2 | 8/2014 | Gero | |
| 8,826,381 | B2 | 9/2014 | Kim | |
| 8,832,302 | B1 | 9/2014 | Bradford | |
| 8,836,536 | B2 | 9/2014 | Marwah | |
| 8,862,774 | B2 | 10/2014 | Vasseur | |
| 8,868,779 | B2 * | 10/2014 | O'Neill et al. | 709/238 |
| 8,903,756 | B2 | 12/2014 | Zhao | |
| 8,934,496 | B2 * | 1/2015 | Vasseur | 370/401 |
| 8,937,865 | B1 | 1/2015 | Kumar | |
| 9,071,498 | B2 | 6/2015 | Beser | |
| 9,112,895 | B1 | 8/2015 | Lin | |
| 2002/0010795 | A1 | 1/2002 | Brown | |
| 2002/0048269 | A1 | 4/2002 | Hong | |
| 2002/0054593 | A1 | 5/2002 | Morohashi | |
| 2002/0077988 | A1 | 6/2002 | Sasaki | |
| 2002/0078066 | A1 | 6/2002 | Robinson | |
| 2002/0138551 | A1 | 9/2002 | Erickson | |
| 2002/0176404 | A1 | 11/2002 | Girard | |
| 2002/0188605 | A1 | 12/2002 | Adya | |
| 2002/0199014 | A1 | 12/2002 | Yang | |
| 2003/0033394 | A1 * | 2/2003 | Stine | 709/222 |
| 2003/0046437 | A1 | 3/2003 | Eytchison | |
| 2003/0048793 | A1 | 3/2003 | Pochon | |
| 2003/0051100 | A1 | 3/2003 | Patel | |
| 2003/0074472 | A1 | 4/2003 | Lucco | |
| 2003/0088696 | A1 * | 5/2003 | McCanne | 709/238 |
| 2003/0097447 | A1 | 5/2003 | Johnston | |
| 2003/0140257 | A1 | 7/2003 | Peterka | |
| 2004/0024879 | A1 | 2/2004 | Dingman | |
| 2004/0030602 | A1 | 2/2004 | Rosenquist | |
| 2004/0073715 | A1 | 4/2004 | Folkes | |
| 2004/0139230 | A1 | 7/2004 | Kim | |
| 2004/0221047 | A1 | 11/2004 | Grover | |
| 2004/0225627 | A1 | 11/2004 | Botros | |
| 2004/0252683 | A1 | 12/2004 | Kennedy | |
| 2005/0003832 | A1 | 1/2005 | Osafune | |
| 2005/0028156 | A1 | 2/2005 | Hammond | |
| 2005/0043060 | A1 | 2/2005 | Brandenberg | |
| 2005/0050211 | A1 | 3/2005 | Kaul | |
| 2005/0074001 | A1 | 4/2005 | Mattes | |
| 2005/0149508 | A1 | 7/2005 | Deshpande | |
| 2005/0159823 | A1 | 7/2005 | Hayes | |
| 2005/0198351 | A1 | 9/2005 | Nog | |
| 2005/0249196 | A1 | 11/2005 | Ansari | |
| 2005/0259637 | A1 | 11/2005 | Chu | |
| 2005/0262217 | A1 | 11/2005 | Nonaka | |
| 2005/0289222 | A1 | 12/2005 | Sahim | |
| 2006/0010249 | A1 | 1/2006 | Sabesan | |
| 2006/0029102 | A1 | 2/2006 | Abe | |
| 2006/0039379 | A1 | 2/2006 | Abe | |
| 2006/0051055 | A1 | 3/2006 | Ohkawa | |
| 2006/0072523 | A1 | 4/2006 | Richardson | |
| 2006/0099973 | A1 | 5/2006 | Nair | |
| 2006/0129514 | A1 | 6/2006 | Watanabe | |
| 2006/0133343 | A1 | 6/2006 | Huang | |
| 2006/0173831 | A1 | 8/2006 | Basso | |
| 2006/0193295 | A1 | 8/2006 | White | |
| 2006/0206445 | A1 | 9/2006 | Andreoli | |
| 2006/0215684 | A1 | 9/2006 | Capone | |
| 2006/0223504 | A1 | 10/2006 | Ishak | |
| 2006/0256767 | A1 | 11/2006 | Suzuki | |
| 2006/0268792 | A1 | 11/2006 | Belcea | |
| 2007/0019619 | A1 | 1/2007 | Foster | |
| 2007/0073888 | A1 | 3/2007 | Madhok | |
| 2007/0094265 | A1 | 4/2007 | Korkus | |
| 2007/0112880 | A1 | 5/2007 | Yang | |
| 2007/0124412 | A1 | 5/2007 | Narayanaswami | |
| 2007/0127457 | A1 | 6/2007 | Mirtorabi | |
| 2007/0160062 | A1 | 7/2007 | Morishita | |

(56) References Cited

U.S. PATENT DOCUMENTS

| | | |
|---|---|---|
| 2007/0162394 A1 | 7/2007 | Zager |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255699 A1 | 11/2007 | Sreenivas |
| 2007/0255781 A1 | 11/2007 | Li |
| 2007/0274504 A1 | 11/2007 | Maes |
| 2007/0276907 A1 | 11/2007 | Maes |
| 2007/0294187 A1 | 12/2007 | Scherrer |
| 2008/0005056 A1 | 1/2008 | Stelzig |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0101357 A1 | 5/2008 | Iovanna |
| 2008/0107034 A1 | 5/2008 | Jetcheva |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0285209 A1 | 11/2009 | Stewart |
| 2009/0287835 A1 | 11/2009 | Jacobson |
| 2009/0288163 A1 | 11/2009 | Jacobson |
| 2009/0292743 A1 | 11/2009 | Bigus |
| 2009/0293121 A1 | 11/2009 | Bigus |
| 2009/0300079 A1 | 12/2009 | Shitomi |
| 2009/0300407 A1 | 12/2009 | Kamath |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0088370 A1 | 4/2010 | Wu |
| 2010/0094767 A1 | 4/2010 | Miltonberger |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0268782 A1 | 10/2010 | Zombek |
| 2010/0272107 A1 | 10/2010 | Papp |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0022812 A1 | 1/2011 | vanderLinden |
| 2011/0055392 A1 | 3/2011 | Shen |
| 2011/0055921 A1 | 3/2011 | Narayanaswamy |
| 2011/0090908 A1 | 4/2011 | Jacobson |
| 2011/0106755 A1 | 5/2011 | Hao |
| 2011/0145597 A1 | 6/2011 | Yamaguchi |
| 2011/0145858 A1 | 6/2011 | Philpott |
| 2011/0153840 A1 | 6/2011 | Narayana |
| 2011/0161408 A1 | 6/2011 | Kim |
| 2011/0202609 A1 | 8/2011 | Chaturvedi |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265174 A1 | 10/2011 | Thornton |
| 2011/0271007 A1 | 11/2011 | Wang |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0036180 A1 | 2/2012 | Thornton |
| 2012/0047361 A1 | 2/2012 | Erdmann |
| 2012/0066727 A1 | 3/2012 | Nozoe |
| 2012/0106339 A1 | 5/2012 | Mishra |
| 2012/0114313 A1 | 5/2012 | Phillips |
| 2012/0120803 A1 | 5/2012 | Farkas |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0314580 A1 | 12/2012 | Hong |
| 2012/0317307 A1 | 12/2012 | Ravindran |
| 2012/0331112 A1 | 12/2012 | Chatani |

(56) References Cited

U.S. PATENT DOCUMENTS

| | | | |
|---|---|---|---|
| 2013/0024560 A1* | 1/2013 | Vasseur et al. | 709/224 |
| 2013/0041982 A1 | 2/2013 | Shi | |
| 2013/0051392 A1 | 2/2013 | Filsfils | |
| 2013/0060962 A1 | 3/2013 | Wang | |
| 2013/0073552 A1 | 3/2013 | Rangwala | |
| 2013/0074155 A1 | 3/2013 | Huh | |
| 2013/0091539 A1 | 4/2013 | Khurana | |
| 2013/0110987 A1 | 5/2013 | Kim | |
| 2013/0111063 A1 | 5/2013 | Lee | |
| 2013/0151584 A1 | 6/2013 | Westphal | |
| 2013/0163426 A1 | 6/2013 | Beliveau | |
| 2013/0166668 A1 | 6/2013 | Byun | |
| 2013/0173822 A1 | 7/2013 | Hong | |
| 2013/0182568 A1 | 7/2013 | Lee | |
| 2013/0185406 A1 | 7/2013 | Choi | |
| 2013/0197698 A1 | 8/2013 | Shah | |
| 2013/0198119 A1 | 8/2013 | Eberhardt, III | |
| 2013/0219038 A1 | 8/2013 | Lee | |
| 2013/0219081 A1 | 8/2013 | Qian | |
| 2013/0219478 A1 | 8/2013 | Mahamuni | |
| 2013/0223237 A1 | 8/2013 | Hui | |
| 2013/0227114 A1* | 8/2013 | Vasseur et al. | 709/224 |
| 2013/0227166 A1 | 8/2013 | Ravindran | |
| 2013/0242996 A1 | 9/2013 | Varvello | |
| 2013/0250809 A1 | 9/2013 | Hui | |
| 2013/0282854 A1 | 10/2013 | Jang | |
| 2013/0282860 A1 | 10/2013 | Zhang | |
| 2013/0282920 A1 | 10/2013 | Zhang | |
| 2013/0304937 A1 | 11/2013 | Lee | |
| 2013/0329696 A1 | 12/2013 | Xu | |
| 2013/0336323 A1 | 12/2013 | Srinivasan | |
| 2013/0343408 A1 | 12/2013 | Cook | |
| 2014/0003232 A1 | 1/2014 | Guichard | |
| 2014/0006565 A1 | 1/2014 | Muscariello | |
| 2014/0029445 A1 | 1/2014 | Hui | |
| 2014/0032714 A1 | 1/2014 | Liu | |
| 2014/0040505 A1 | 2/2014 | Barton | |
| 2014/0074730 A1 | 3/2014 | Arensmeier | |
| 2014/0075567 A1 | 3/2014 | Raleigh | |
| 2014/0082135 A1 | 3/2014 | Jung | |
| 2014/0089454 A1 | 3/2014 | Jeon | |
| 2014/0096249 A1 | 4/2014 | Dupont | |
| 2014/0129736 A1 | 5/2014 | Yu | |
| 2014/0136814 A1 | 5/2014 | Stark | |
| 2014/0140348 A1 | 5/2014 | Perlman | |
| 2014/0143370 A1 | 5/2014 | Vilenski | |
| 2014/0146819 A1 | 5/2014 | Bae | |
| 2014/0149733 A1 | 5/2014 | Kim | |
| 2014/0156396 A1 | 6/2014 | deKozan | |
| 2014/0165207 A1 | 6/2014 | Engel | |
| 2014/0172783 A1 | 6/2014 | Suzuki | |
| 2014/0172981 A1 | 6/2014 | Kim | |
| 2014/0173034 A1 | 6/2014 | Liu | |
| 2014/0192717 A1 | 7/2014 | Liu | |
| 2014/0195328 A1 | 7/2014 | Ferens | |
| 2014/0195666 A1 | 7/2014 | Dumitriu | |
| 2014/0233575 A1 | 8/2014 | Xie | |
| 2014/0237085 A1 | 8/2014 | Park | |
| 2014/0280823 A1 | 9/2014 | Varvello | |
| 2014/0281489 A1 | 9/2014 | Peterka | |
| 2014/0281505 A1 | 9/2014 | Zhang | |
| 2014/0282816 A1 | 9/2014 | Xie | |
| 2014/0289325 A1 | 9/2014 | Solis | |
| 2014/0289790 A1 | 9/2014 | Wilson | |
| 2014/0314093 A1 | 10/2014 | You | |
| 2014/0365550 A1 | 12/2014 | Jang | |
| 2015/0006896 A1 | 1/2015 | Franck | |
| 2015/0018770 A1 | 1/2015 | Baran | |
| 2015/0032892 A1 | 1/2015 | Narayanan | |
| 2015/0063802 A1 | 3/2015 | Bahadur | |
| 2015/0089081 A1* | 3/2015 | Thubert et al. | 709/239 |
| 2015/0095481 A1 | 4/2015 | Ohnishi | |
| 2015/0095514 A1 | 4/2015 | Yu | |
| 2015/0188770 A1 | 7/2015 | Naiksatam | |
| 2015/0195149 A1* | 7/2015 | Vasseur et al. | 370/252 |

FOREIGN PATENT DOCUMENTS

| | | | |
|---|---|---|---|
| EP | 0295727 | A2 | 12/1988 |
| EP | 0757065 | A2 | 7/1996 |
| EP | 1077422 | A2 | 2/2001 |
| EP | 1384729 | A1 | 1/2004 |
| EP | 2124415 | A2 | 11/2009 |
| EP | 2214357 | A1 | 8/2010 |
| WO | 03005288 | A2 | 1/2003 |
| WO | 03042254 | A1 | 5/2003 |
| WO | 03049369 | A2 | 6/2003 |
| WO | 03091297 | A1 | 11/2003 |
| WO | 2007113180 | A1 | 10/2007 |
| WO | 2007144388 | A1 | 12/2007 |
| WO | 2011049890 | A1 | 4/2011 |

OTHER PUBLICATIONS

RTMP (2009). Available online at http://wwwimages.adobe.com/www.adobe.com/content/dam/Adobe/en/devnet/rtmp/ pdf/rtmp specification 1.0.pdf.

S. Kamara and K. Lauter. Cryptographic Cloud Storage. Financial Cryptography and Data Security. Springer Berlin Heidelberg (2010).

Soh et al., "Efficient Prefix Updates for IP Router Using Lexicographic Ordering and Updateable Address Set", Jan. 2008, IEEE Transactions on Computers, vol. 57, No. 1.

Beben et al., "Content Aware Network based on Virtual Infrastructure", 2012 13th ACIS International Conference on Software Engineering.

Biradar et al., "Review of multicast routing mechanisms in mobile ad hoc networks", Aug. 16, Journal of Network$.

D. Trossen and G. Parisis, "Designing and realizing and information-centric Internet," IEEE Communications Magazing, vol. 50, No. 7, pp. 60-67, Jul. 2012.

Garcia-Luna-Aceves et al., "Automatic Routing Using Multiple Prefix Labels", 2012, IEEE, Ad Hoc and Sensor Networking Symposium.

Gasti, Paolo et al., 'DoS & DDoS in Named Data Networking', 2013 22nd International Conference on Computer Communications and Networks (ICCCN), Aug. 2013, pp. 1-7.

Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.

J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.

Kaya et al., "A Low Power Lookup Technique for Multi-Hashing Network Applications", 2006 IEEE Computer Society Annual Symposium on Emerging VLSI Technologies and Architectures, Mar. 2006.

Hoque et al., "NLSR: Named-data Link State Routing Protocol", Aug. 12, 2013, ICN'13.

Nadeem Javaid, "Analysis and design of quality link metrics for routing protocols in Wireless Networks", PhD Thesis Defense, Dec. 15, 2010, Universete Paris-Est.

Fall, K. et al., "DTN: an architectural retrospective", Selected areas in communications, IEEE Journal on, vol. 28, No. 5, Jun. 1, 2008, pp. 828-835.

Gritter, M. et al., 'An Architecture for content routing support in the Internet', Proceedings of 3rd Usenix Symposium on Internet Technologies and Systems, 2001, pp. 37-48.

"CCNx," http://ccnx.org/. downloaded Mar. 11, 2015.

"Content Delivery Network", Wikipedia, Dec. 10, 2011, http://en.wikipedia.org/w/index.php?title=Content_delivery_network &oldid=465077460.

"Digital Signature" archived on Aug. 31, 2009 at http://web.archive.org/web/20090831170721/http://en.wikipedia.org/wiki/Digital_signature.

"Introducing JSON," http://www.json.org/. downloaded Mar. 11, 2015.

"Microsoft PlayReady," http://www.microsoft.com/playready/. downloaded Mar. 11, 2015.

(56) References Cited

OTHER PUBLICATIONS

"Pursuing a pub/sub internet (PURSUIT)," http://www.fp7-pursuit.ew/PursuitWeb/. downloaded Mar. 11, 2015.

"The FP7 4WARD project," http://www.4ward-project.eu/. downloaded Mar. 11, 2015.

A. Broder and A. Karlin, "Multilevel Adaptive Hashing", Jan. 1990, pp. 43-53.

Detti, Andrea, et al. "CONET: a content centric inter-networking architecture." Proceedings of the ACM SIGCOMM workshop on Information-centric networking. ACM, 2011.

A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.

Afanasyev, Alexander, et al. "Interest flooding attack and countermeasures in Named Data Networking." IFIP Networking Conference, 2013. IEEE, 2013.

Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).

B. Ahlgren et al., 'A Survey of Information-centric Networking' IEEE Commun. Magazine, Jul. 2012, pp. 26-36.

B. Lynn. The Pairing-Based Cryptography Library, http://crypto.stanford.edu/pbc/.

Bari, MdFaizul, et al. 'A survey of naming and routing in information-centric networks.' Communications Magazine, IEEE 50.12 (2012): 44-53.

Baugher, Mark et al., "Self-Verifying Names for Read-Only Named Data", 2012 IEEE Conference on Computer Communications Workshops (INFOCOM Wkshps), Mar. 2012, pp. 274-279.

Brambley, Michael, A novel, low-cost, reduced-sensor approach for providing smart remote monitoring and diagnostics for packaged air conditioners and heat pumps. Pacific Northwest National Laboratory, 2009.

C. Gentry and A. Silverberg. Hierarchical ID-Based Cryptography. Advances in Cryptology—ASIACRYPT 2002. Springer Berlin Heidelberg (2002).

C.A. Wood and E. Uzun, "Flexible end-to-end content security in CCN," in Proc. IEEE CCNC 2014, Las Vegas, CA, USA, Jan. 2014.

Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.

Cho, Jin-Hee, Ananthram Swami, and Ray Chen. "A survey on trust management for mobile ad hoc networks." Communications Surveys & Tutorials, IEEE 13.4 (2011): 562-583.

Compagno, Alberto, et al. "Poseidon: Mitigating interest flooding DDoS attacks in named data networking." Local Computer Networks (LCN), 2013 IEEE 38th Conference on. IEEE, 2013.

Conner, William, et al. "A trust management framework for service-oriented environments." Proceedings of the 18th international conference on World wide web. ACM, 2009.

Content Centric Networking Project (CCN) [online], http://ccnx.org/releases/latest/doc/technical/, Downloaded Mar. 9, 2015.

Content Mediator Architecture for Content-aware Networks (COMET) Project [online], http://www.comet-project.org/, Downloaded Mar. 9, 2015.

D. Boner, C. Gentry, and B. Waters, 'Collusion resistant broadcast encryption with short ciphertexts and private keys,' in Proc. CRYPTO 2005, Santa Barbara, CA, USA, Aug. 2005, pp. 1-19.

D. Boneh and M. Franklin. Identity-Based Encryption from the Weil Pairing. Advances in Cryptology—CRYPTO 2001, vol. 2139, Springer Berlin Heidelberg (2001).

D.K. Smetters, P. Golle, and J.D. Thornton, "CCNx access control specifications," PARC, Tech. Rep., Jul. 2010.

Dabirmoghaddam, Ali, Maziar Mirzazad Barijough, and J. J. Garcia-Luna-Aceves. 'Understanding optimal caching and opportunistic caching at the edge of information-centric networks,' Proceedings of the 1st international conference on Information-centric networking. ACM, 2014.

Detti et al., "Supporting the Web with an information centric network that routes by name", Aug. 2012, Computer Networks 56, pp. 3705-3702.

Dijkstra, Edsger W., and Carel S. Scholten. 'Termination detection for diffusing computations.' Information Processing Letters 11.1 (1980): 1-4.

Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.

E. Rescorla and N. Modadugu, "Datagram transport layer security," IETF RFC 4347, Apr. 2006.

E.W. Dijkstra, W. Feijen, and A.J.M. Van Gasteren, "Derivation of a Termination Detection Algorithm for Distributed Computations," Information Processing Letter, vol. 16, No. 5, 1983.

Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.

G. Ateniese, K. Fu, M. Green, and S. Hohenberger. Improved Proxy Reencryption Schemes with Applications to Secure Distributed Storage. In the 12th Annual Network and Distributed System Security Symposium (2005).

G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.

G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.

G. Xylomenos et al., "A Survey of Information-centric Networking Research," IEEE Communication Surveys and Tutorials, Jul. 2013.

Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.

Garcia-Luna-Aceves, Jose J. 'A unified approach to loop-free routing using distance vectors or link states.' ACM SIGCOMM Computer Communication Review. vol. 19. No. 4. ACM, 1989.

Garcia-Luna-Aceves, Jose J. 'Name-Based Content Routing in Information Centric Networks Using Distance Information' Proc ACM ICN 2014, Sep. 2014.

Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.

Ghodsi, Ali, et al. "Information-centric networking: seeing the forest for the trees." Proceedings of the 10th ACM Workshop on Hot Topics in Networks. ACM, 2011.

Ghodsi, Ali, et al. "Naming in content-oriented architectures." Proceedings of the ACM SIGCOMM workshop on Information-centric networking. ACM, 2011.

Gupta, Anjali, Barbara Liskov, and Rodrigo Rodrigues. "Efficient Routing for Peer-to-Peer Overlays." NSDI. vol. 4. 2004.

H. Xiong, X. Zhang, W. Zhu, and D. Yao. CloudSeal: End-to-End Content Protection in Cloud-based Storage and Delivery Services. Security and Privacy in Communication Networks. Springer Berlin Heidelberg (2012).

Heckerman, David, John S. Breese, and Koos Rommelse. "Decision-Theoretic Troubleshooting." Communications of the ACM. 1995.

Heinemeier, Kristin, et al. "Uncertainties in Achieving Energy Savings from HVAC Maintenance Measures in the Field." ASHRAE Transactions 118.Part 2 {2012).

Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).

Hogue et al., 'NLSR: Named-data Link State Routing Protocol', Aug. 12, 2013, ICN 2013, pp. 15-20.

(56) References Cited

OTHER PUBLICATIONS https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Hur, "Improving security and efficiency in attribute-based data sharing," IEEE Trans. Knowledge Data Eng., vol. 25, No. 10, pp. 2271-2282, Oct. 2013.
J. Shao and Z. Cao. CCA-Secure Proxy Re-Encryption without Pairings. Public Key Cryptography. Springer Lecture Notes in Computer Sciencevol. 5443 (2009).
V. Jacobson et al., 'Networking Named Content,' Proc. IEEE CoNEXT '09, Dec. 2009.
Jacobson, Van et al., "Content-Centric Networking, Whitepaper Describing Future Assurable Global Networks", Palo Alto Research Center, Inc., Jan. 30, 2007, pp. 1-9.
Jacobson, Van et al. 'VoCCN: Voice Over Content-Centric Networks.' Dec. 1, 2009. ACM ReArch'09.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
Koponen, Teemu et al., "A Data-Oriented (and Beyond) Network Architecture", SIGCOMM '07, Aug. 27-31, 2007, Kyoto, Japan, XP-002579021, p. 181-192.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
M. Blaze, G. Bleumer, and M. Strauss, 'Divertible protocols and atomic prosy cryptography,' in Proc. EUROCRYPT 1998, Espoo, Finland, May-Jun. 1998, pp. 127-144.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matted Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE—A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
Rosenberg, J. "Interactive Connectivity Establishment (ICE): A Protocol for Network Address Translator (NAT) Traversal for Offer/Answer Protocols", Apr. 2010, pp. 1-117.
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Sandvine, Global Internet Phenomena Report—Spring 2012. Located online at http://www.sandvine.com/downloads/ documents/Phenomenal H 2012/Sandvine Global Internet Phenomena Report 1H 2012.pdf.

(56) References Cited

OTHER PUBLICATIONS

Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shih, Eugene et al., 'Wake on Wireless: An Event Driven Energy Saving Strategy for Battery Operated Devices', Sep. 23, 2002, pp. 160-171.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
The Despotify Project (2012). Available online at http://despotify.sourceforge.net/.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
V. K. Adhikari, S. Jain, Y. Chen, and Z.-L. Zhang. Vivisecting Youtube:An Active Measurement Study. In INFOCOM12 Mini-conference (2012).
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al., "DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014): 66-73.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.

* cited by examiner

MULTI-PUBLISHER ROUTING PROTOCOL FOR NAMED DATA NETWORKS

BACKGROUND

1. Field

This disclosure is generally related to named data networking (NDN). More specifically, this disclosure is related to a multi-publisher routing protocol for forwarding Interests to a plurality of publishers associated with a name prefix specified by the Interest.

2. Related Art

In custodian-based routing, a node that is an authoritative source for a namespace creates two bindings: one binding from the namespace to an identifier for the node; and another binding from the node's identifier to one or more network addresses for the node. Other network nodes can cache data in the same namespace, and can return this cached data to satisfy an Interest to this namespace. However, they are not authoritative sources for the namespace, so they cannot create the binding to the namespace, such as by advertising themselves as a source for the namespace.

To make matters worse, in custodian-based routing, an authoritative source floods an advertisement for a namespace over the network, such as by using the CCN sync protocol. This allows the network peers to know all the bindings in the computer network. However, managing all namespace-to-device bindings across all nodes in a computer network does not scale well when namespaces have a large set of authoritative sources, especially as some of these authoritative sources may only be sources for short periods of time.

In link-state advertising, a publisher advertises a set of names that map to the publisher's node, and advertises the connectivity of the publisher's node. For example, a publisher with a node "z" may advertise a set of names {"/sweet", "tart"}→z, and a node connectivity z→{w, x}. There are two common versions of LSA: Optimized Link State Routing Protocol (OLSR), and Named-data Link State Routing Protocol (NLSR). NLSR performs LSA by specifying adjacency information (e.g., a→{(a,b), (a,c), c→{(c,d), (c,a)}), and specifying content available from each node (e.g., a→{$c_i$, $c_j$}, d→{$c_j$}). Hence, a node p adjacent to nodes {b, d} can obtain $c_j$ from node d, and a node b adjacent to nodes {a, d, p} can obtain $c_j$ from node a or node d. The link state advertisements are written as content centric networking (CCN) content objects, and are synchronized using the CCN sync protocol between the nodes. Hence, NLSR requires using CCN for routing messages across the network. Also, NLSR suffers from similar scalability issues to custodian-based routing, given that NLSR creates a mapping of names to nodes, and advertises node addresses.

OLSR, on the other hand, uses its own messaging format between nodes. OLSR does not require using CCN sync to exchange messages between network nodes. For example, OLSR uses its own messaging format to carry information about the names, instead of sending out information about IP addresses. Also, OLSR supports one path to nearest content. For example, the network nodes can flood their content information across the network. Each node receives a digest of the content provided by the other nodes, and connectivity information for the other nodes. Hence, each node can perform Dijkstra's algorithm to compute the shortest paths to nodes and to content. These nodes can also determine other possible paths by deleting a link for this shortest path, and recomputing a second-shortest path using the remaining network graph. The end result is that the network node can determine various shortest paths to a named content object.

Unfortunately, the above-mentioned routing protocols require all publishers to flood the network with their information. For example, multiple network nodes may each generate different content for a given namespace. In order for network clients to be able to obtain content from these various publishers, each of these publishers needs to flood the network with information that maps them to the namespace. This allows an Interest message from a network client to reach any of the publishers in the network. However, flooding the network with information from every publisher in the network can require the network nodes to include an undesirably large repository of namespace-to-device mappings. Also, each time a publisher enters or leaves a namespace, the publisher and the other network nodes will need to flood changes to the namespace-to-device mappings to reflect the publishers that have entered or left the network.

SUMMARY

One embodiment provides a multi-publisher routing system that facilitates forwarding an Interest to multiple publishers associated with a namespace. During operation, the network devices across a computer network can perform distance-vector routing with one or more network neighbors to determine a network topology for a computer network. Also, one or more network devices may receive a namespace-join message from one or more publishers in the computer network that are to provide content objects for the namespace. These network devices that receive the namespace-join message can construct an acyclic graph that includes one or more publishers for the namespace, and includes one or more forwarder nodes that form network paths between the one or more publishers. Then, when a network node in the acyclic graph receives an Interest message that specifies a name prefix associated with the namespace, this network node can forward the Interest message along the acyclic graph to one or more publishers associated with the namespace.

In some embodiments, a network node can receive a core election for a multi-publisher namespace, such that the core election specifies a namespace, and specifies a publisher in the acyclic graph that is to function as a core network node for the namespace. The network node can store the core election in association with the namespace. This network node can be a node in the acyclic graph, such as a forwarder or a publisher, or can be a node outside the acyclic graph. Then, when the network node receives the Interest, the network node can forward the Interest message to at least the elected core.

In some variations to these embodiments, the one or more network devices can construct the acyclic graph by forwarding the namespace-join message toward the elected core to activate the network paths in the acyclic graph that include the forwarder nodes between the publisher and the elected core.

In some variations to these embodiments, a network node can receive an election of one or more publishers in the acyclic graph that are each to function as a core network node for the namespace.

In some variations to these embodiments, after receiving the core election from a first neighbor in the acyclic graph, a network node can forward the core election to a second neighbor in the acyclic graph.

In some variations to these embodiments, a network device can receive a first core advertisement from a first neighbor in the acyclic graph, such that the first core advertisement specifies a first publisher in the acyclic graph that is to function as a core for the namespace. If the network device also receives a second core advertisement from a second neighbor in the acyclic graph, which specifies a second publisher in the acyclic graph that is to function as a core for the namespace, the network device compares information on the first and second core network nodes to elect a core for the namespace. Then, if the network device elects the first network node as the core for the namespace, the network device forwards the first core advertisement to at least the second neighbor.

In some variations to these embodiments, the acyclic graph includes a directed acyclic graph (DAG) topology.

In some variations to these embodiments, during distance-vector routing, a network device can receive network-neighborhood information from the one or more network neighbors. The network device then updates local network-neighborhood information to include the network-neighborhood information from the one or more network neighbors, and sends the local network-neighborhood information to the one or more network neighbors. The network device can determine a set of network nodes in the network topology, and can determine an interface and a distance to a respective network node in the network topology. This distance can indicate, for example, a cost to reach the respective network node. The network device then stores the direction and distance to the respective network node.

BRIEF DESCRIPTION OF THE FIGURES

In the figures, like reference numerals refer to the same figure elements.

DETAILED DESCRIPTION

Figure 1:
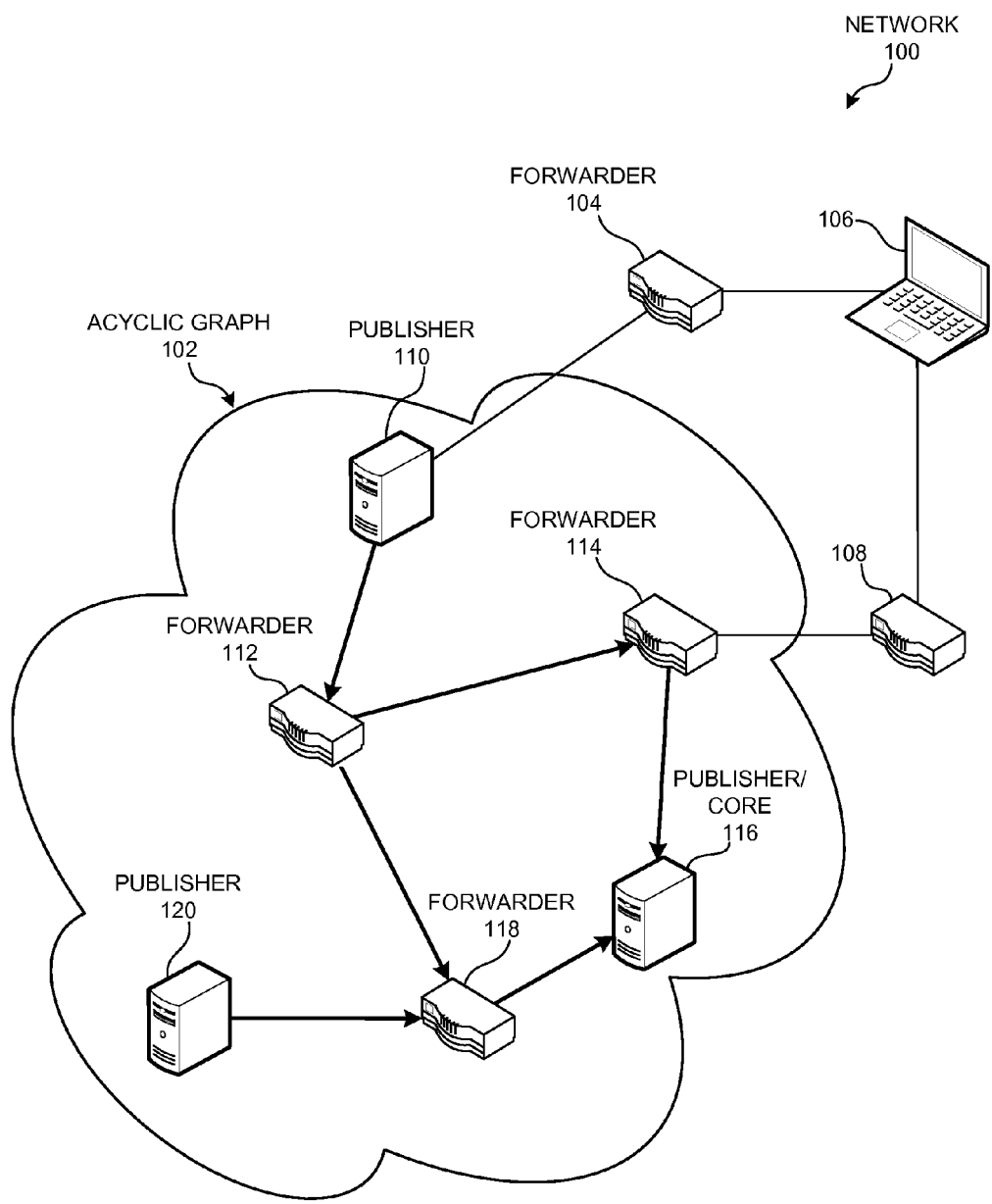
FIG. 1 illustrates an exemplary computing environment that facilitates forwarding an Interest to multiple publishers associated with a namespace in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a multi-publisher routing protocol that solves the problem of forwarding an Interest to multiple content publishers over a named data network. For example, in a typical named data network (NDN), network nodes forward an Interest toward one content producer that can return content that satisfies the Interest. If a network client desires to obtain content from multiple content producers, the client may need to include additional information in the Interest's name to guide the Interest toward a different content producer.

However, using the multi-publisher routing protocol, the network nodes can bifurcate an Interest to multiple publishers that have joined the namespace. This allows a group of computers to establish a shared session, such as a video conference or chat session, by each computer becoming a "publisher" for the session. A member of the session can obtain content from all other members by disseminating an Interest with a namespace for the session, and nodes of the computer network can bifurcate the Interest to the various other members of the session. Hence, using the multi-publisher routing protocol, a computer can receive content generated by multiple publishers, without having to request content from each publisher directly.

To configure the multi-publisher routing protocol for a given namespace, a computer network can elect one or more network nodes to be a "core" for the namespace. This allows any device in the network to forward Interests for the namespace toward the core. Also, various producers can "join" the namespace, which constructs an acyclic graph that forms paths from these producers to the one or more cores. When a network client disseminates an Interest for the namespace, the network nodes can forward the Interest toward a core until the Interest reaches any node of the acyclic graph. A forwarder node of the acyclic graph can bifurcate the Interest toward multiple publishers that have joined the namespace.

In some embodiments, the network clients, network nodes (e.g., forwarders), and publishers communicate over an information-centric network (ICN). In ICN, each piece of content is individually named, and each piece of data is bound to a unique name that distinguishes the data from any other piece of data, such as other versions of the same data or data from other sources. This unique name allows a network device to request the data by disseminating a request or an Interest that indicates the unique name, and can obtain the data independent from the data's storage location, network location, application, and means of transportation. Named-data network (NDN) or a content-centric network (CCN) are examples of ICN architecture; the following terms describe elements of an NDN or CCN architecture:

Content Object: A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names: A name in an ICN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ndn, and test.txt can be structured in a left-oriented prefix-major fashion to form the name "/parc/home/ndn/test.txt." Thus, the name "/parc/home/ndn" can be a "parent" or "prefix" of "/parc/home/ndn/test.txt." Additional components can be used to distinguish between different versions of the content item, such as a collaborative document.

In some embodiments, the name can include a non-hierarchical identifier, such as a hash value that is derived from the Content Object's data (e.g., a checksum value) and/or from elements of the Content Object's name. A description of a hash-based name is described in U.S. patent application Ser. No. 13/847,814 (entitled "ORDERED-ELEMENT NAMING FOR NAME-BASED PACKET FORWARDING," by inventor Ignacio Solis, filed 20 Mar. 2013), which is hereby incorporated by reference. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest: A packet that indicates a request for a piece of data, and includes a name (or a name prefix) for the piece of data. A data consumer can disseminate a request or Interest across an information-centric network, which CCN/NDN routers can propagate toward a storage device (e.g., a cache server) or a data producer that can provide the requested data to satisfy the request or Interest.

In some embodiments, the ICN system can include a content-centric networking (CCN) architecture. However, the methods disclosed herein are also applicable to other ICN architectures as well. A description of a CCN architecture is described in U.S. patent application Ser. No. 12/338,175 (entitled "CONTROLLING THE SPREAD OF INTERESTS AND CONTENT IN A CONTENT CENTRIC NETWORK," by inventors Van L. Jacobson and Diana K. Smetters, filed 18 Dec. 2008), which is hereby incorporated by reference.

FIG. 1 illustrates an exemplary computer network 100 that facilitates forwarding an Interest to multiple publishers associated with a namespace in accordance with an embodiment. Specifically, environment 100 can include a set of publishers 110, 116, and 120 for a namespace. Each of these publishers can create new content, and can publish this content using a name that includes the namespace as the prefix. This allows a client device 106 to obtain content published by any of the publishers by disseminating an Interest that includes the namespace.

In some embodiments, network 100 uses a core-based acyclic graph 102 to establish multicast routing of Interests to multiple publishers. Acyclic graph 102 can include a directed acyclic graph (DAG) topology that forwards Interests toward an elected core for acyclic graph 102. For example, network nodes in acyclic graph 102 can elect a publisher as a core for the graph (e.g., core 116), such that the elected core can receive Interests for the acyclic graph, and can dispatch the Interests toward the other publishers. When an Interest is disseminated for the acyclic graph's name prefix, the Interest can flow to the acyclic graph's core, who then bifurcates the Interest to the other member nodes of the acyclic graph. Hence, the core can allow Interests to multicast to the group of publishers for the graph's namespace.

Acyclic graph 102 can also include a set of forwarders 112, 114, and 118 that form directed paths from one or more publishers to the core for the acyclic graph. A publisher that is not a core can send a period "join" message toward the acyclic graph's core. This join message activates the paths in the acyclic graph that include the forwarders between the publisher and the core.

Also, in some embodiments, the publishers in acyclic graph 102 can participate in a multicast group, such as by disseminating an Interest with the namespace to obtain content from the other publishers in the group. For example, a group of users may be interested in engaging in a conversation on a topic "/apple/pie." These users may configure publishers 110, 116, and 120 to establish a chat session or video conference by joining the namespace "/apple/pie." This allows publishers 110, 116, and 120 to generate content for the namespace, and to disseminate Interests for this namespace to receive content from the other nodes in the namespace.

During the session, publisher 116 can generate an Interest for the "/apple/pie" namespace, and multicasts the Interest to publishers 110 and 120. The forwarder nodes in network 100 (e.g., forwarders 112, 114, and 118) then forward the Interest to both publishers 110 and 120, but not to other nodes that have not joined the namespace. For example, when forwarder 118 receives the Interest from publisher 116, forwarder 118 may bifurcate the Interest toward publisher 120 and forwarder 112. Forwarder 112 then forwards the Interest to publisher 110. Publishers 110 and 12 can both respond to the Interest to return new data for the session. This ensures that each participant of the session can receive content (e.g., video streams or chat messages) published by all other participants of the session.

It is also possible for other nodes in acyclic graph 102 to bifurcate the Interest. For example, client device 106 can receive data from the namespace "/apple/pie" by disseminating an Interest for the namespace. Note that the routers and other network nodes in network 100 can include routing information for the "/apple/pie" namespace that routes the related Interests toward core 116. In a custodian-based networking protocol, for example, the network nodes in network 100 (e.g., forwarders 104 and 108) may include information that establishes core 116 as the custodian for the namespace. This allows client device 106 and/or any other network device to disseminate Interests for this namespace toward acyclic graph 102. In some occasions, the Interest can reach forwarder node forwarder 114 before the Interest reaches core 116. Forwarder node 114 can bifurcate the Interest to send one copy to core 116, and to send another copy to forwarder 112. Forwarder 112 can send the Interest to publisher 110, and core 116 can send the Interest to publisher 120 via forwarder 118.

Figure 2:
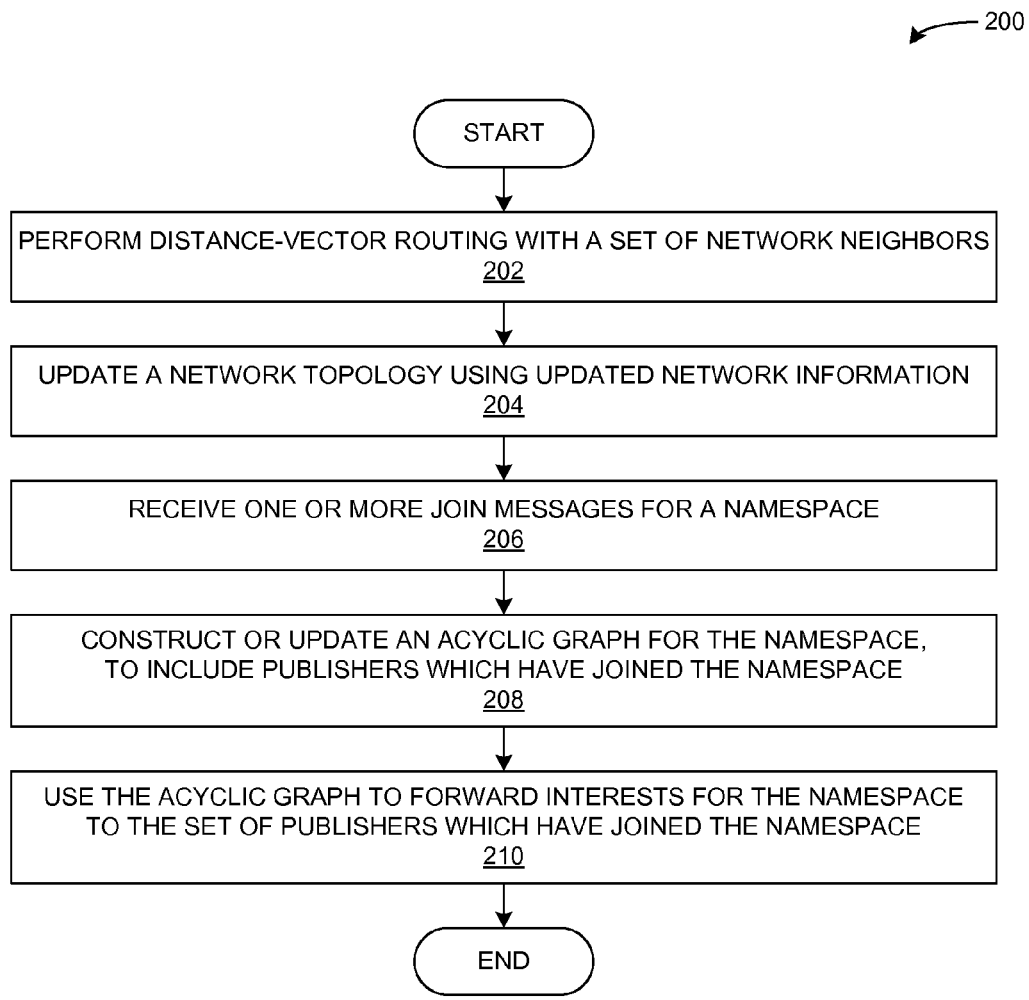
FIG. 2 presents a flow chart illustrating a method for constructing and using a multi-publisher acyclic graph to forward Interests to a set of publishers in accordance with an embodiment.

FIG. 2 presents a flow chart illustrating a method 200 for constructing and using a multi-publisher acyclic graph to forward Interests to a set of publishers in accordance with an embodiment. During operation, the set of network nodes can perform distance-vector routing with their neighbors to exchange neighborhood information (operation 202). This neighborhood information can include a direction and a distance to any link in the network. The direction can include, for example, a next hop address and an exit interface. The distance can include a cost measurement associated with reaching a target node, such as a number of hops, a network latency, etc. In some embodiments, each network node can inform its neighbors of changes to the network topology, either periodically or when the topology changes are detected. These network nodes then generate or update their network topology using the network information they receive from their neighbors (operation 204). This network topology may include a table (also referred to as a vector) of a minimum distance or cost to each node in the network.

In some embodiments, one or more "publisher" network nodes in the network can be a "core" for a namespace in a named data network. A core can advertise itself as a source for content within the namespace, which allows NDN forwarder nodes to forward Interests for this content toward the core. Other publishers for the namespace can also provide content to satisfy Interests associated with the namespace without having to be a "core," by sending a "join" that propagates across the network toward a core for the namespace.

The network node can receive one or more join messages for the namespace (operation 206), and can use these join messages to construct or update an acyclic graph for the namespace (operation 208). For example, the local network node can analyze the join message to determine a network node that is joining the namespace as a publisher, registers this network node as a publisher for the namespace, and stores an interface to this publisher. The local network node can also forward the join message toward a core to allow other nodes along a path to the core to register the publisher with the namespace. By the time the join message reaches the core, the network nodes along the path to the core would have created a directed path from the publisher to the core. These network nodes in a path between a publisher and a core are hereinafter referred to as "forwarder" nodes. Once the publishers have joined the namespace, the forwarder nodes can use the acyclic graph to forward Interests for the namespace to the core, and can also forward the Interests toward the publishers that have joined the namespace (operation 210).

Figure 3:
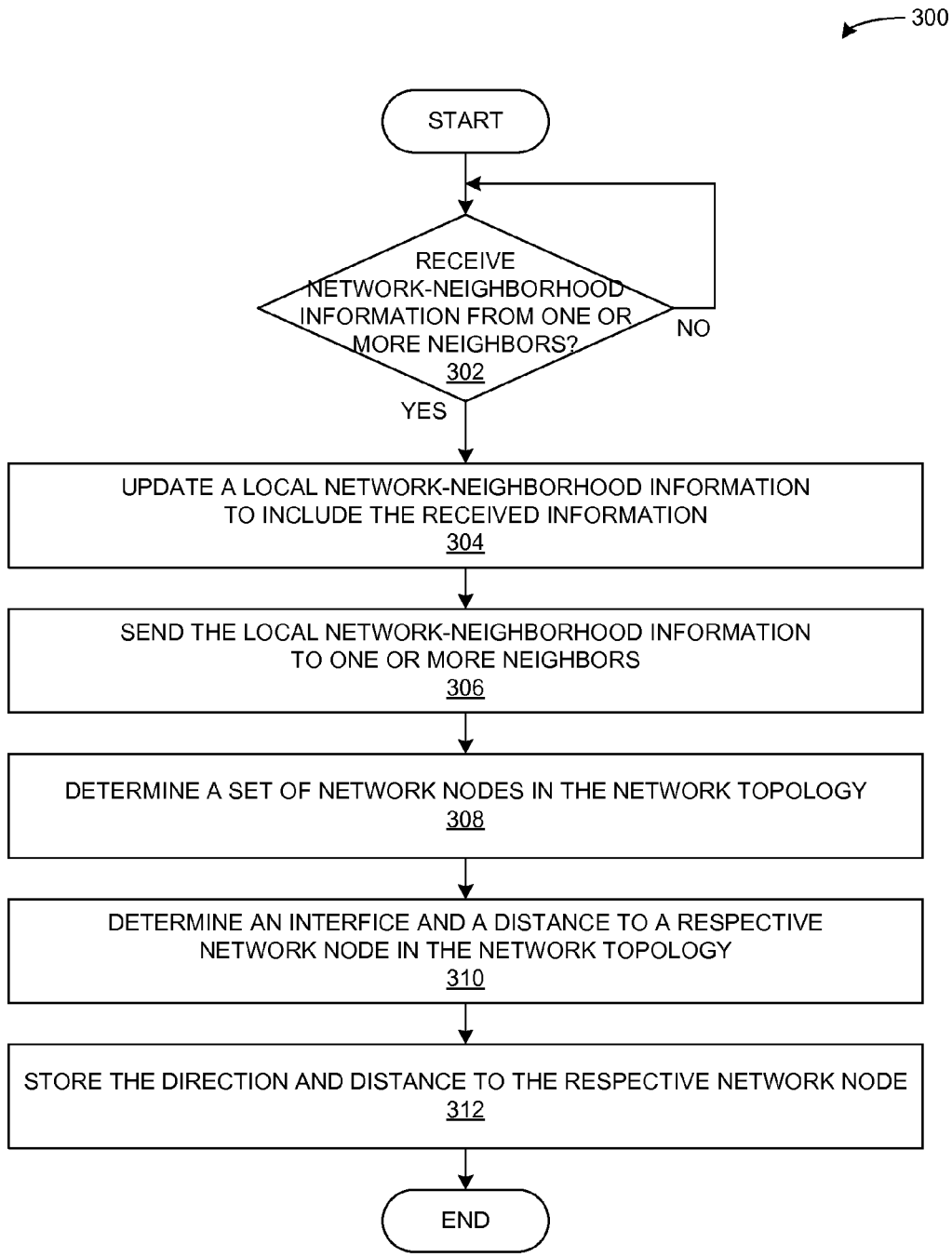
FIG. 3 presents a flow chart illustrating a method for performing distance-vector routing over a computer network in accordance with an embodiment.

FIG. 3 presents a flow chart illustrating a method 300 for performing distance-vector routing over a computer network in accordance with an embodiment. During operation, a network node can determine whether it has received network-neighborhood information from one or more network neighbors (operation 302). For example, the network node can receive updated network-neighborhood information from an existing neighbor, or can receive network-neighborhood information from a new neighbor. If the network node has received new or updated network-neighborhood information, the network node can update its local network-neighborhood information to include the received information (operation 304). The network node can also forward the information from one neighbor to one or more other neighbors (operation 306).

The local network node can use the network-neighborhood information to generate a distance vector to a set of other network nodes in the network topology. For example, the local node can identify a set of network nodes in the network topology (operation 308), and determines an interface and a distance to each respective network node in the network topology (operation 310). The local node can store the direction and distance to each network node in a flat data structure, for example, in a vector or array (operation 312).

Constructing a Multi-Publisher Acyclic Graph

Figure 4:
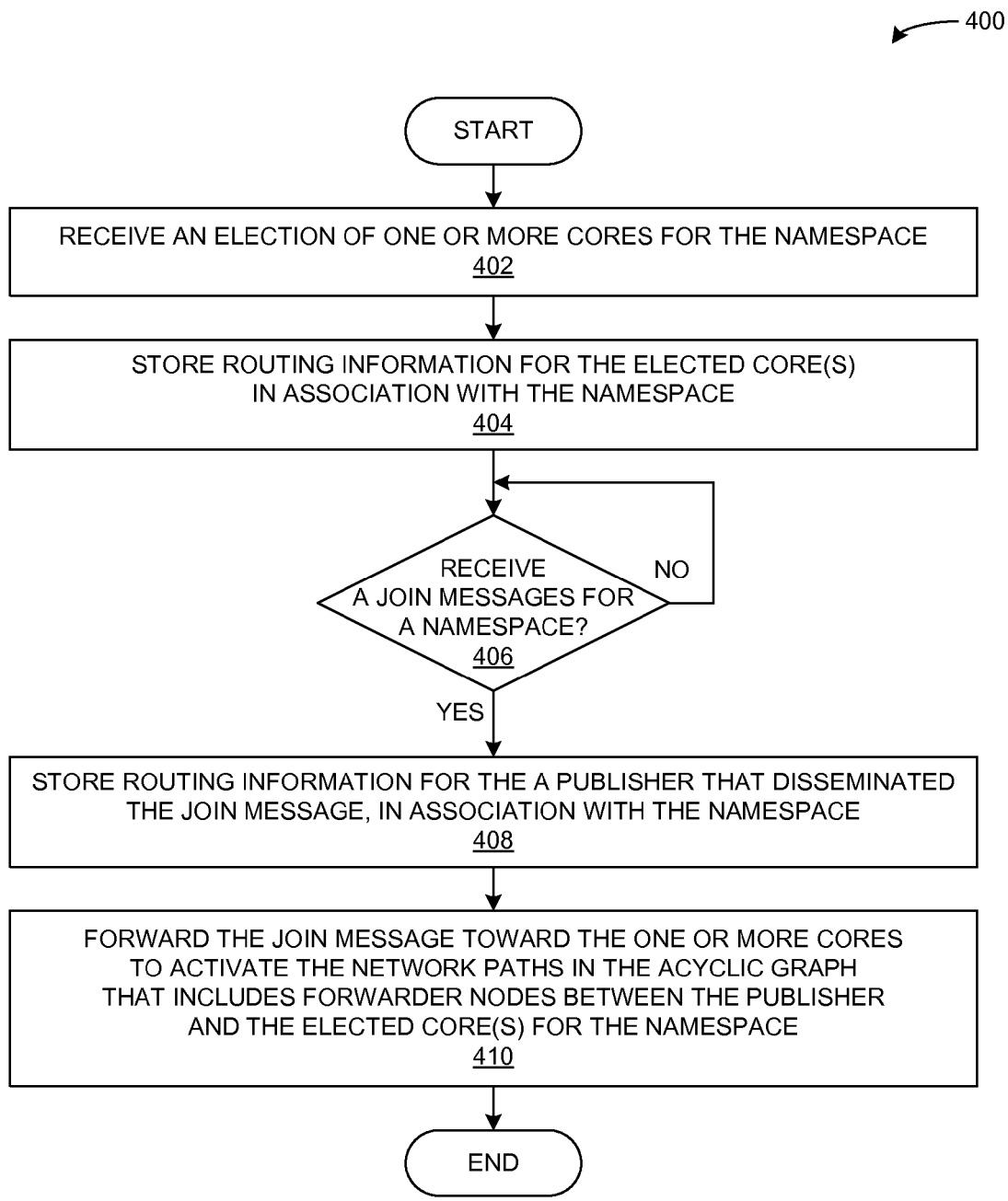
FIG. 4 presents a flow chart illustrating a method for constructing a multi-publisher acyclic graph for routing Interests to a set of publishers in a namespace in accordance with an embodiment.

FIG. 4 presents a flow chart illustrating a method 400 for constructing a multi-publisher acyclic graph for routing Interests to a set of publishers in a namespace in accordance with an embodiment. During operation, a network node can receive an election of one or more cores for the namespace (operation 402), and stores routing information for the elected cores in association with the namespace (operation 404). Storing the information on the elected cores allows the local network node to forward Interest messages associated with the namespace toward an acyclic graph for the namespace. In some embodiments, the network node can receive the core election from a system administrator, and the core election can specify one core, or multiple cores, for the acyclic graph. In some other embodiments, the network nodes of a network topology can perform a distributed election of a core by using a common election function to elect a single core that has the best performance metrics.

The network device can also receive a join message from a publisher that is to provide content for the namespace (operation 406). If the network device receives a join message for the namespace, the network device can store routing information for the publisher in association with the namespace (operation 408), and forwards the join message toward the one or more elected cores for the namespace (operation 410). Storing the publisher's routing information and forwarding the join message to the elected cores causes the local network node to join the acyclic graph for the namespace, and to become a forwarder in the acyclic graph. Once the publisher's join message reaches an elected core, the forwarder nodes between the publisher and the elected core form a directed path to the core in the acyclic graph for the namespace.

In some embodiments, a system administrator can elect one or more cores for an acyclic graph. This allows the system administrator to use any persistent publishers for the namespace to bifurcate Interests to other publishers that may join the namespace intermittently. For example, the system administrator can select multiple publishers to use as cores, and can configure all nodes in the acyclic graph to recognize these multiple publishers as elected cores. Alternatively, the system administrator can configure these publishers to advertise themselves as "administrator-elected" cores that were elected by the system administrator. This way, when a forwarder of the acyclic graph receives multiple core advertisements, the forwarder can determine that the multiple publishers have been elected as simultaneous cores. Either of these two techniques produces a deterministic mapping of a namespace to a set of elected cores.

In some embodiments, the acyclic graph includes one core that is elected by the other nodes in the acyclic graph based on the core's reachability and/or performance. For example, each publisher for a namespace can elect itself as a core for the namespace, and disseminates a core advertisement (which elects the local publisher as a core for the namespace) to its neighbors. When the publisher's neighbors or other network nodes receive the core advertisement, these nodes proceed to elect the publisher as the core for the namespace. However, when a network node receives multiple core advertisements, the network node analyzes performance metrics for the advertised cores to elect one core for the acyclic graph. Eventually, all nodes in the acyclic graph agree upon a core for the acyclic graph, as these nodes have all received the same publisher's core advertisement, and they have each elected this publisher as the core.

Figure 5:
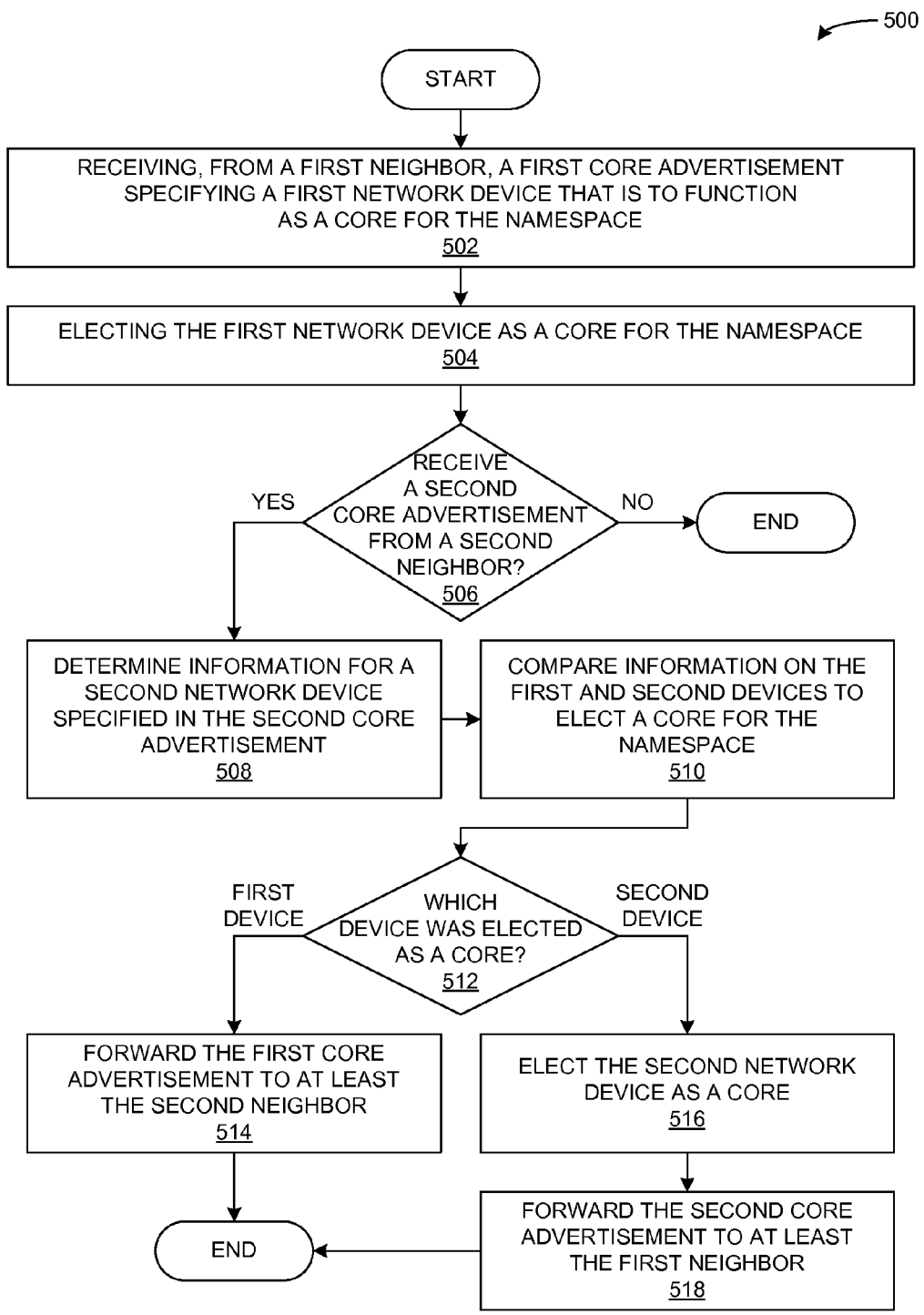
FIG. 5 presents a flow chart illustrating a method for electing a core for a multi-publisher acyclic graph in accordance with an embodiment.

FIG. 5 presents a flow chart illustrating a method 500 for electing a core for a multi-publisher acyclic graph in accordance with an embodiment. During operation, the network node can receive a core advertisement $A_1$ from a neighbor $N_1$ (operation 502), such that core advertisement $A_1$ can specify a namespace, and a network device $D_1$ that is to function as a core for the namespace. If no core has been elected for the namespace, the network device can elect the network device $D_1$ as a core for the namespace (operation 504).

It is possible for the network device to receive to receive other core advertisements at a future time. If the network device receives a core advertisement $A_2$ from a neighbor $N_2$ for the same namespace as core advertisement $A_1$ (operation 506), the network device can select a core from advertisements $A_1$ and $A_2$. For example, the network device can determine information for a network device $D_2$ specified in the core advertisement $A_2$ (operation 508), and compares metric information on devices $D_1$ and $D_2$ to elect a core for the namespace (operation 510). This metric information can be provided by the publishers themselves in their core advertisements. For example, the metric information can include an IP address, a node centrality measurement, a node performance measurement (e.g., available bandwidth, responsiveness, etc.), and/or any other network-performance metric now known or later developed. In some embodiments, a publisher can compute its node centrality based on a number or percentage of nodes across the network for which the publisher knows its identity, and based on the publisher's reachability to these nodes.

If the local network device decides to keep device $D_1$ as the elected core (operation 512), the network device can forward the core advertisement $D_1$ to neighbor $N_2$ that had provided advertisement $A_2$ (operation 514). When neighbor $N_2$ receives core advertisement $A_2$, neighbor $N_2$ can perform the same election process between core advertisements $A_1$ and $A_2$ to elect device $D_1$ as the core for the namespace. Also, in some embodiments, the local network device and neighbor $N_2$ can retain core advertisement $A_2$ for device D2 as a backup core election, which can be used as the primary core on the occasion that device $D_1$ goes offline or becomes unreachable.

On the other hand, if the local network device decides to elect device $D_2$ as the core for the namespace (operation 512), the local network device proceeds to elect device $D_2$ as the core (operation 516), and forwards core advertisement $A_2$ to neighbor $N_1$, and to any other neighbors that have not elected device $D_2$ as the core for the namespace (operation 518). In some embodiments, the local network device and neighbor $N_1$ can store core advertisement $A_1$ for device $D_1$ as a backup core election, which can be used as the primary core on the occasion that device $D_2$ goes offline or becomes unreachable.

In some embodiments, the elected core does not need to be a persistent publisher for the namespace, given that the acyclic graph can accommodate cores that go off-line by electing a new core for the acyclic graph, or by reverting to a backup core for the acyclic graph. For example, when a network node receives multiple core advertisements, the network node can store the core advertisements for the publishers that it does not elect as a core. This way, if a core network device fails, stop advertising itself, or becomes unreachable, the local network node can perform core-failover by electing a new core based on the stored core advertisements. Also, if a network node elects a new core via core-failover, the network node can forward the core advertisement for the new core to its neighbors so that they too may use this core advertisement while performing core-failover.

Processing Interests

In some embodiments, the nodes in the computer network need to know who the cores are for a given namespace, and how to reach the cores. For example, a set of nodes outside an acyclic graph for the namespace can use link state advertisement (LSA) to forward an Interest toward a core. Once the Interest reaches nodes in the acyclic graph, these nodes can use the multi-publisher routing protocol to forward the Interest to all publishers associated with the Interest's name prefix.

Figure 6:
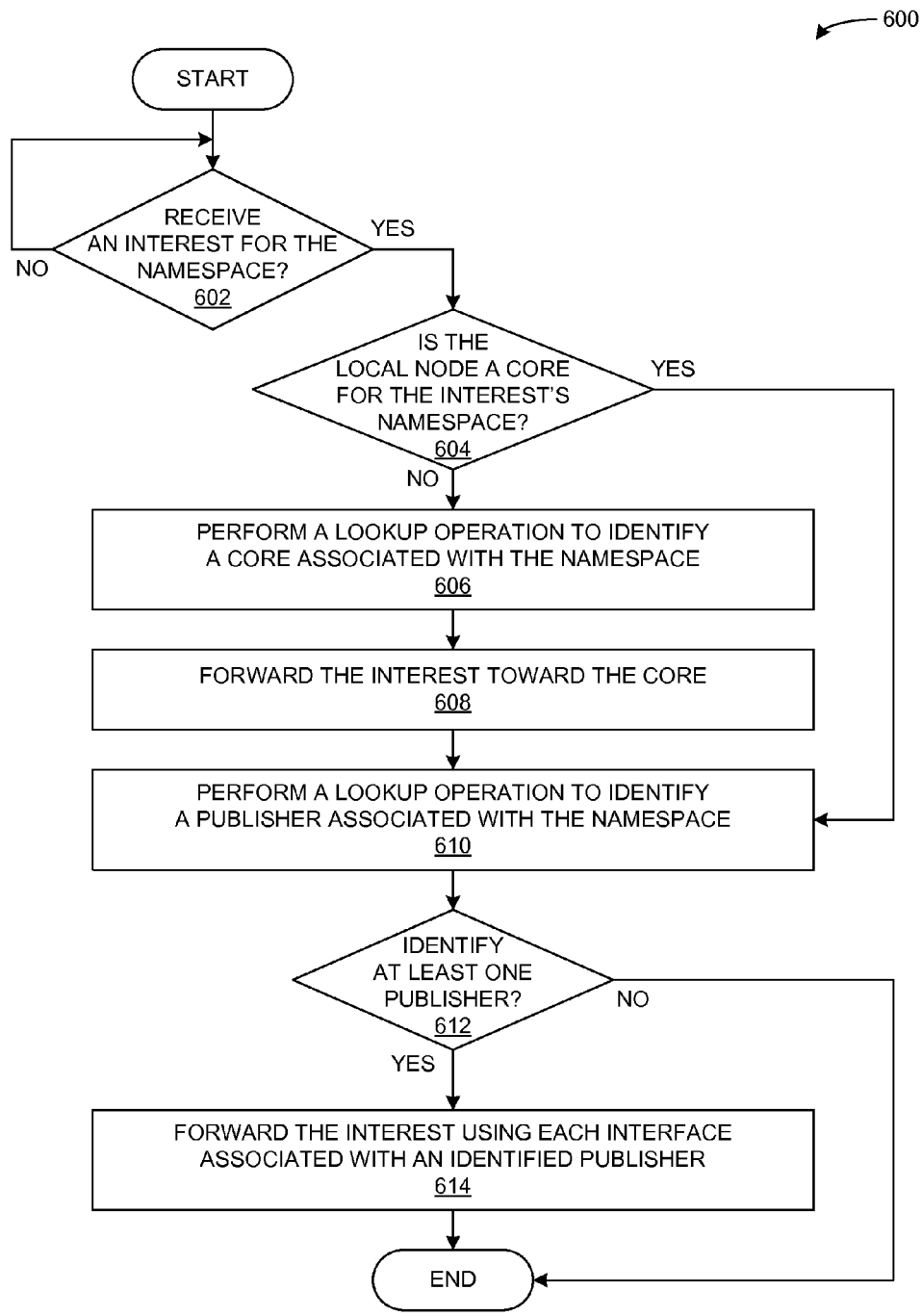
FIG. 6 presents a flow chart illustrating a method for routing an Interest to a set of publishers in a multi-publisher acyclic graph in accordance with an embodiment.

FIG. 6 presents a flow chart illustrating a method 600 for routing an Interest to a set of publishers in a multi-publisher acyclic graph in accordance with an embodiment. For example, a network device outside the namespace's acyclic graph can forward the Interest toward a core of the acyclic graph, or to any other node of the acyclic graph. A network device that belongs to the namespace's acyclic graph can forward the Interest toward a core and/or one or more publishers for the namespace.

During operation, the network device can receive an Interest for the namespace (operation 602), and can determine whether the device is a core for the namespace (operation 604). If the device is not a core for the namespace, the network device can perform a lookup operation to identify a core (operation 606), and forwards the Interest toward the core (operation 608). This allows a node outside the acyclic graph to forward the Interest to reach any node of the graph, and also allows a forwarder of the acyclic graph to forward the Interest toward a nearest core for the namespace.

In some embodiments, if the local network device that receives the Interest is a forwarder or a core of the acyclic graph, the network device may have received a join message from one or more publishers for the namespace. If so, the device can forward the Interest directly to the publisher, without requiring the Interest to first reach the core. For example, the device can perform a lookup operation to identify one or more publishers associated with the namespace (operation 610). Recall that the network device stores each publisher in association with the namespace, and in association with an interface to use to forward packets to the publisher. If the device identifies at least one publisher (operation 612), the device can forward the Interest using an interface associated with each identified publisher (operation 614).

In some embodiments, if the network device is a core for the namespace, the core may not need to forward the Interest to another core (e.g., operations 606 and 608). Hence, the network device can proceed to operation 610 to forward the Interest toward one or more publishers, without searching for other cores to forward the Interest to.

Also, once the Interest from the client device reaches a publisher that can return data to satisfy the Interest's name, this publisher can return a content object that includes the data for the client device. The content object propagates across the network via a path traversed and established by the Interest. In some embodiments, the client device receives one content object for each Interest that it disseminates. This is because the network nodes establish a temporary path by including an entry in a pending Interest table (PIT) for the Interest. Once the content object is returned to satisfy the Interest, the network nodes (e.g., forwarders) perform a lookup operation in the PIT to determine an interface to use to return the content object, and return the content object via this interface. If another publisher returns a second content object to satisfy the Interest, and the PIT entry was removed by a network node after returning the first content object, the network node can cache the content object in association with the Interest without returning the content object toward the client device.

The client device can obtain multiple content objects from the various publishers by disseminating additional Interests for the namespace. A publisher that returns a content object to satisfy an Interest can also include additional information that can be used by the client to generate follow-up Interests to receive additional content objects. For example, a publisher can generate a content object to include the data requested by the client, and to also include (e.g., in the name, or in the payload) a list of other publishers that can also provide content to the client. Also, if the publisher can return a content object but does not have any additional data to return to the client, the additional information can inform the client that the publisher does not have additional content for the namespace. Then, after the client device receives the content object, the client device can generate a follow-up Interest which excludes this publisher as a target for the Interest, and/or may specify the other publishers toward which the Interest is to be forwarded. This way, the forwarders in the acyclic graph can forward the Interest toward the other publishers based on the inclusion list, and/or based on the exclusion list. The client device can also generate the follow-up Interest to specify a list of received content objects, which the publishers can use to determine which other content objects to return to the client.

It is possible that the follow-up Interest can arrive at a forwarder that has cached a content object for the namespace due to the namespace being removed from the PIT by another content object. In some embodiments, the forwarder can return this cached content object to satisfy the Interest. The forwarder can also remove the cached content object after returning the content object to the client, for example, to avoid returning duplicate content objects if the client disseminates additional Interests for the same namespace. Alternatively, the forwarder can retain the content object in the cache to satisfy Interests from other clients. In this case, the forwarder returns the cached content object if the Interest's list of received content object does not specify the cached content object and/or if the Interest's list of excluded publishers doesn't include the cached content object's publisher.

Figure 7:
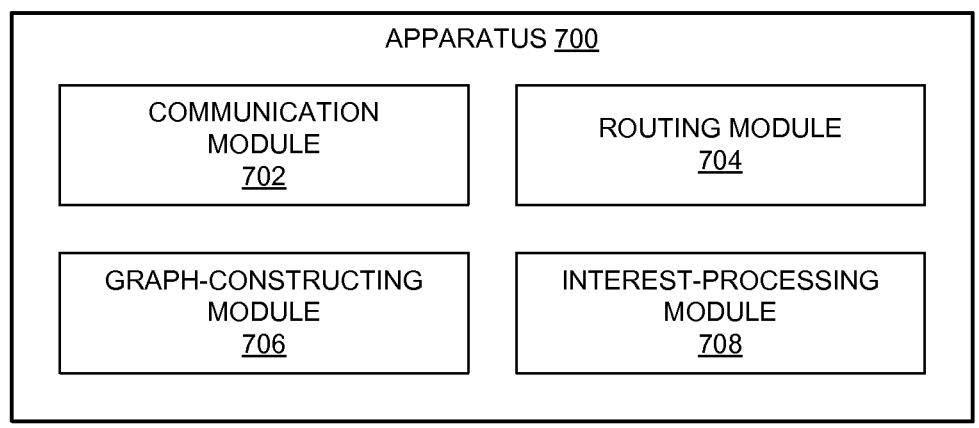
FIG. 7 an apparatus that facilitates forwarding an Interest to multiple publishers associated with a namespace in accordance with an embodiment.

FIG. 7 illustrates an exemplary apparatus 700 that facilitates forwarding an Interest to multiple publishers associated with a namespace in accordance with an embodiment. Apparatus 700 can comprise a plurality of modules which may communicate with one another via a wired or wireless communication channel. Apparatus 700 may be realized using one or more integrated circuits, and may include fewer or more modules than those shown in FIG. 7. Further, apparatus 700 may be integrated in a computer system, or realized as a separate device which is capable of communicating with other computer systems and/or devices. Specifically, apparatus 700 can comprise a communication module 702, a routing module 704, a graph-constructing module 706, and an Interest-processing module 708.

In some embodiments, communication module 702 can receive a namespace-join message from a publisher that is to provide content for the namespace, and can receive Interest messages from clients or other publishers that desire to receive data associated with the namespace. Routing module 704 can perform distance-vector routing with one or more network neighbors to determine a network topology for a computer network. Graph-constructing module 706 can construct an acyclic graph that includes multiple publishers for the namespace. Interest-processing module 708 can forward the Interest message along the acyclic graph to one or more publishers associated with the namespace, in response to the communication module receiving an Interest message that specifies a name prefix associated with the namespace.

Figure 8:
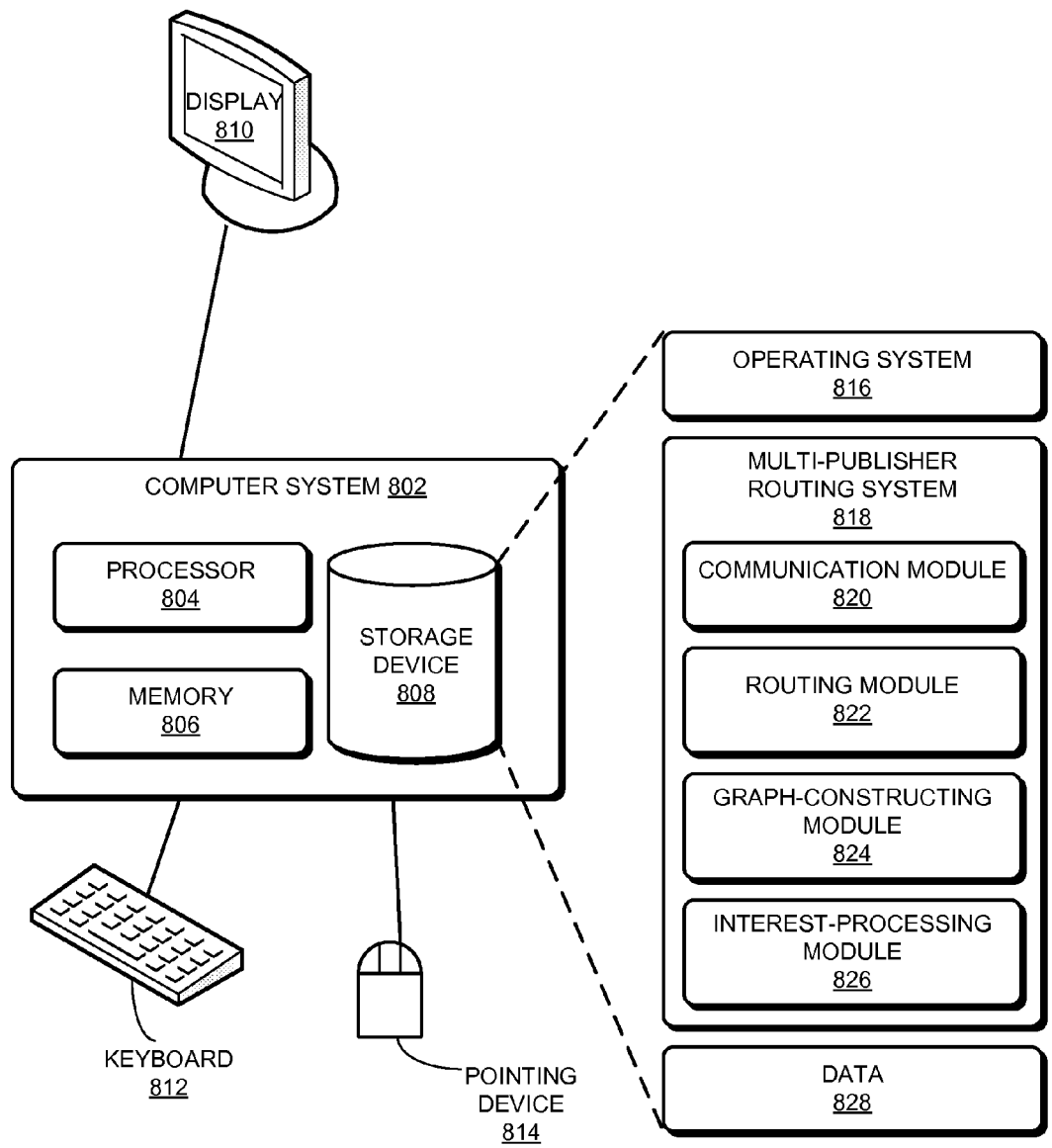
FIG. 8 a computer system that facilitates forwarding an Interest to multiple publishers associated with a namespace in accordance with an embodiment.

FIG. 8 illustrates an exemplary computer system 802 that facilitates forwarding an Interest to multiple publishers associated with a namespace in accordance with an embodiment. Computer system 802 includes a processor 804, a memory 806, and a storage device 808. Memory 806 can include a volatile memory (e.g., RAM) that serves as a managed memory, and can be used to store one or more memory pools. Furthermore, computer system 802 can be coupled to a display device 810, a keyboard 812, and a pointing device 814. Storage device 808 can store operating system 816, multi-publisher routing system 818, and data 828.

Routing system 818 can include instructions, which when executed by computer system 802, can cause computer system 802 to perform methods and/or processes described in this disclosure. Specifically, routing system 818 may include instructions for receiving a namespace-join message from a publisher that is to provide content for the namespace, and for receiving Interest messages from clients or other publishers that desire to receive data associated with the namespace (communication module 820). Routing system 818 can include instructions for performing distance-vector routing with one or more network neighbors to determine a network topology for a computer network (routing module 822), and for constructing an acyclic graph that includes multiple publishers for the namespace (graph-constructing module 824). Routing system 818 can also include instructions for forwarding the Interest message along the acyclic graph to one or more publishers associated with the namespace, in response to receiving an Interest message that specifies a name prefix associated with the namespace (Interest-processing module 826).

Data 828 can include any data that is required as input or that is generated as output by the methods and/or processes described in this disclosure.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, comprising:
performing, by a network node, distance-vector routing with one or more network neighbors to determine a network topology for a computer network;
receiving a namespace-join message that specifies a publisher in the computer network that is to provide content objects for the namespace;
constructing an acyclic graph that includes one or more publishers for the namespace, and includes one or more forwarder nodes that form network paths between the one or more publishers;
receiving, from a first neighbor in the acyclic graph, a first core advertisement for a first publisher in the acyclic graph that is to function as a core for the namespace;

receiving, from a second neighbor in the acyclic graph, a second core advertisement for a second publisher in the acyclic graph that is to function as a core for the namespace;

comparing information on the first and second core network nodes to elect a core for the namespace;

responsive to electing the first network node as the core for the namespace, forwarding the first core advertisement to the second neighbor and the elected core, and storing the core election in association with the namespace, wherein the core election specifies a namespace, and specifies a publisher in the acyclic graph that is to function as a core network node for the namespace; and responsive to receiving an Interest message that specifies a name prefix associated with the namespace, forwarding the Interest message along the acyclic graph to one or more publishers associated with the namespace.

2. The method of claim 1, wherein constructing the acyclic graph involves:

forwarding the namespace-join message toward the elected core to activate the network paths in the acyclic graph that include the forwarder nodes between the publisher and the elected core.

3. The method of claim 1, wherein receiving the core election involves receiving an election of one or more publishers in the acyclic graph that are each to function as a core network node for the namespace.

4. The method of claim 1, further comprising:

responsive to receiving the core election from a first network neighbor in the acyclic graph, forwarding the core election to at least a second neighbor in the acyclic graph.

5. The method of claim 1, wherein the acyclic graph includes a directed acyclic graph (DAG) topology.

6. The method of claim 1, wherein performing distance-vector routing involves:

receiving network-neighborhood information from the one or more network neighbors;

updating a local network-neighborhood information to include the network-neighborhood information from the one or more network neighbors;

sending the local network-neighborhood information to the one or more network neighbors;

determining a set of network nodes in the network topology;

determining an interface and a distance to a respective network node in the network topology, wherein the distance indicates a cost to reach the respective network node; and storing the direction and distance to the respective network node.

7. A non-transitory computer-readable storage medium storing instructions that when executed by a computer cause the computer to perform a method, the method comprising:

performing distance-vector routing with one or more network neighbors to determine a network topology for a computer network;

receiving a namespace-join message that specifies a publisher in the computer network that is to provide content objects for the namespace;

constructing an acyclic graph that includes one or more publishers for the namespace, and includes one or more forwarder nodes that form network paths between the one or more publishers;

receiving, from a first neighbor in the acyclic graph, a first core advertisement for a first publisher in the acyclic graph that is to function as a core for the namespace;

receiving, from a second neighbor in the acyclic graph, a second core advertisement for a second publisher in the acyclic graph that is to function as a core for the namespace;

comparing information on the first and second core network nodes to elect a core for the namespace;

responsive to electing the first network node as the core for the namespace, forwarding the first core advertisement to the second neighbor and the elected core, and storing the core election in association with the namespace, wherein the core election specifies a namespace, and specifies a publisher in the acyclic graph that is to function as a core network node for the namespace; and responsive to receiving an Interest message that specifies a name prefix associated with the namespace, forwarding the Interest message along the acyclic graph to one or more publishers associated with the namespace.

8. The storage medium of claim 7, wherein constructing the acyclic graph involves:

forwarding the namespace-join message toward the elected core to activate the network paths in the acyclic graph that include the forwarder nodes between the publisher and the elected core.

9. The storage medium of claim 7, wherein receiving the core election involves receiving an election of one or more publishers in the acyclic graph that are each to function as a core network node for the namespace.

10. The storage medium of claim 7, further comprising:

responsive to receiving the core election from a first network neighbor in the acyclic graph, forwarding the core election to at least a second neighbor in the acyclic graph.

11. The storage medium of claim 7, wherein the acyclic graph includes a directed acyclic graph (DAG) topology.

12. The storage medium of claim 7, wherein performing distance-vector routing involves:

receiving network-neighborhood information from the one or more network neighbors;

updating a local network-neighborhood information to include the network-neighborhood information from the one or more network neighbors;

sending the local network-neighborhood information to the one or more network neighbors;

determining a set of network nodes in the network topology;

determining an interface and a distance to a respective network node in the network topology, wherein the distance indicates a cost to reach the respective network node; and storing the direction and distance to the respective network node.

13. An apparatus, comprising:

a routing module to perform distance-vector routing with one or more network neighbors to determine a network topology for a computer network;

a communication module to receive a namespace-join message that specifies a publisher in the computer network that is to provide content objects for the namespace; and a graph-constructing module to constructing an acyclic graph that includes one or more publishers for the namespace, and includes one or more forwarder nodes that form network paths between the one or more publishers;

wherein the communication module is further configured to:

receive, from a first neighbor in the acyclic graph, a first core advertisement for a first publisher in the acyclic graph that is to function as a core for the namespace; and receive, from a second neighbor in the acyclic graph, a second core advertisement for a second publisher in the acyclic graph that is to function as a core for the namespace; and wherein the apparatus further comprises:

a core-electing module to:

compare information on the first and second core network nodes to elect a core for the namespace; and responsive to electing the first network node as the core for the namespace, forward the first core advertisement to the second neighbor and the elected core, and store the core election in association with the namespace, wherein the core election specifies a namespace, and specifies a publisher in the acyclic graph that is to function as a core network node for the namespace; and an Interest-processing module to:

process an Interest message received by the communication module, wherein the an Interest message specifies a name prefix associated with the namespace; and forward the Interest message along the acyclic graph to one or more publishers associated with the namespace.

14. The apparatus of claim 13, wherein while constructing the acyclic graph, the graph-constructing module is further configured to forward the namespace-join message toward the elected core to activate the network paths in the acyclic graph that include the forwarder nodes between the publisher and the elected core.

15. The apparatus of claim 13, wherein while receiving the core election, the communication module is further configured to receive an election of one or more publishers in the acyclic graph that are each to function as a core network node for the namespace.

16. The apparatus of claim 13, wherein the communication module is further configured to forward the core election to at least a second neighbor in the acyclic graph, in response to receiving the core election from a first network neighbor in the acyclic graph.

17. The apparatus of claim 13, wherein the acyclic graph includes a directed acyclic graph (DAG) topology.

18. The apparatus of claim 13, wherein while performing distance-vector routing, the routing module is further configured to:

receive network-neighborhood information from the one or more network neighbors;

update a local network-neighborhood information to include the network-neighborhood information from the one or more network neighbors;

send the local network-neighborhood information to the one or more network neighbors;

determine a set of network nodes in the network topology;

determine an interface and a distance to a respective network node in the network topology, wherein the distance indicates a cost to reach the respective network node; and store the direction and distance to the respective network node.

* * * * *